United States Patent [19]

McVicar

[11] Patent Number: 5,864,410
[45] Date of Patent: Jan. 26, 1999

[54] PERIPHERAL BUS POWERED DOCUMENT SCANNING DEVICE

[75] Inventor: David N. McVicar, El Dorado, Calif.

[73] Assignee: Storm Technology, Inc., Mountain View, Calif.

[21] Appl. No.: 831,848

[22] Filed: Apr. 1, 1997

[51] Int. Cl.$^6$ .................................................. H04N 1/04
[52] U.S. Cl. ........................ 358/498; 358/496; 358/474
[58] Field of Search ................................. 358/474, 496, 358/498, 400, 505, 488, 471, 494; 382/312; 271/8.1, 109, 788, 791; 250/234–236, 208.1; H04N 1/40, 1/04, 1/10

[56] References Cited

U.S. PATENT DOCUMENTS

| | | | |
|---|---|---|---|
| 5,468,943 | 11/1995 | Gatto et al. | 358/496 |
| 5,517,332 | 5/1996 | Barry et al. | 358/496 |
| 5,579,128 | 11/1996 | Cheng | 358/474 |
| 5,621,544 | 4/1997 | Ogura et al. | 358/496 |
| 5,625,711 | 4/1997 | Nicholson et al. | 382/309 |
| 5,760,926 | 6/1998 | Howard | 358/474 |

OTHER PUBLICATIONS

Clyman, J., "In Search of the Perfect Peripheral Bus," *PC Magazine*, vol. 14, No. 13, Jul. 1995, p. 158.
Slater, M., "USB Destined to Dominate," *Electronic Engineering Times*, May 15, 1995, p. 43.
Wong, W., "Ode to USB: Now Many Periphals Can Plug and Play on One Serial Bus," *Computer Shopper*, vol. 15, No. 8, Aug. 1995, p. 574.
Yacono, J., "Ride the Magic Bus," *Windows Magazine*, Jul. 1, 1995, p. 32.

*Primary Examiner*—Edward L. Coles
*Assistant Examiner*—Cheukfan Lee
*Attorney, Agent, or Firm*—Townsend and Townsend and Crew

[57] ABSTRACT

A peripheral powered document scanning device includes a frame, contact image sensor ("CIS") module, a drive platen, document drive platen bearings, springs, a non-enveloping worm drive assembly, a printed circuit board, and a document sensor. The frame comprises rigid members that include an upper frame member, a lower frame member, and right and left endplate members. The four-piece frame is configured so that the upper frame member and the lower frame member are opposite to each other and each is connected at their right and left ends to the right endplate member and the left endplate member, respectively. Each endplate member includes a longitudinal slot where the drive platen rests on the springs so that the drive platen moves in a longitudinal direction with respect to the frame. The CIS module is secured to the upper frame member and remains fixed with respect to the frame. The worm drive assembly includes a drive motor, a single start worm that has a helical tooth and is rotatably coupled to a shaft of the drive motor, and a worm gear that has gear teeth and is rotatably coupled to the drive platen. The helical tooth of the single start worm meshes with the gear teeth of the worm gear so that when the drive motor operates and the single start worm rotates, the worm gear also rotates. As the worm gear rotates, the drive platen rotates so that a document is transported through the scanning device for scanning. In an alternative embodiment, the components of the scanning device are assembled in a two-part case that is frameless.

15 Claims, 12 Drawing Sheets

PERIPHERAL BUS POWERED DOCUMENT SCANNING DEVICE

RELATED APPLICATIONS

The subject of this application is related to the subject matter of U.S. patent application Ser. No. 08/829,962 entitled "Scanner Powered by Peripheral Bus," filed on even date herewith by Joseph Pinzarrone, David McVicar, Sergio Maggi, David Wegmuller, and Emmanuel Reusens. The application has the same assignee as the present invention, and is incorporated herein by reference in its entirety.

BACKGROUND OF THE INVENTION

1. Field of the Invention

The invention relates to the field of electronic document scanning devices, and more particularly, to the field of document scanning devices drawing power from a peripheral bus carrying parasitic power, such as a universal serial bus power source.

2. Brief Description of the Related Art

Document scanning devices are known peripherals for computers. A conventional document scanning device assembly is a computer peripheral that includes a contact image sensor ("CIS") module, a document drive roller, and a drive motor. In conventional document scanning devices, the document drive roller remains fixed relative to the assembly and is driven by the drive motor. The CIS module is spring mounted to the assembly and must have space for vertical clearance above the CIS module so that the CIS module can move longitudinally with respect to the scanner housing. Conventional document scanning devices scan images from a document quickly and with good resolution. These scanning devices, however, do have many drawbacks.

One problem encountered by conventional document scanning devices is torque twisting, and is further illustrated in FIG. 1a. Conventional document scanning devices include a CIS module 10 with scanning lenses 10a, movably attached to a housing 15 through a spring 12, and include a document drive roller 20 that contacts the lenses 10a of the CIS module 10.

When a document is scanned in conventional document scanning devices the document drive roller 20 rotates to feed a document through the scanner. As the document drive roller 20 rotates, the force applied to the lenses 10a of a CIS module 10 induces a torque on the CIS module 10. The torque on the CIS module 10 causes the CIS module 10 to rotate because it is movably coupled to the housing through the spring 12. The CIS module 10 rotates until the sides of the CIS module 10 impact against the housing 15 of the assembly. The rotation of the CIS module 10 causes the required motor torque to drive the document drive roller 20 to increase because of a wedging effect on the rotated CIS module 10. Increasing the motor torque to drive the document drive roller 20 increases the power draw required to operate the document scanning device.

Another problem associated with conventional document scanning devices also arises from this scanning operation and is illustrated in FIG. 1b. The lenses 10a of the CIS module 10 are positioned at a desired contact point 11 that is shown aligned with a center of the document drive roller 20. When a document is scanned and the CIS module 10 is rotated as a document is drawn through the assembly, the lenses 10a of the CIS module 10 begin to shift away 11' from the desired contact point 11 in a scanning operation. Thus, because the lenses 10a of the CIS module 10 are not aligned at the desired contact point 11, the scanning resolution is negatively affected.

Yet another problem with conventional document scanning devices is that the power draw required for a scanning operation is much greater than parasitic power available through a peripheral bus such as universal serial bus specifications. Recent computer industry trends have introduced the universal serial bus as the peripheral connection port of choice for computer and peripheral manufactures and end users. The universal serial bus is a specification developed by Intel, Microsoft, and others and used by the likes of IBM, Compaq, Dell, and other computer manufactures.

Specifically, the universal serial bus provides a single peripheral connection point on a computer that includes data communication connections and power connections. Thus, a peripheral connected to a universal serial bus connection point would not require a separate power source for operation if the power required does not exceed the power supplied by the connection point. As such, most conventional peripherals, such as conventional document scanning devices, are unsuitable for use with the universal serial bus because their current designs require greater power than that available through the universal serial bus.

Therefore, there is a need for a document scanning device that produces a high quality document scan and that may draw power from a peripheral bus, such as a universal serial bus, that provides parasitic power and that has a minimized power load with a maximum torque for scanning documents.

SUMMARY OF THE INVENTION

In accordance with the present invention, a document scanning device that draws power from a peripheral bus that provides parasitic power, such as a universal serial bus, for example. In a preferred embodiment, the document scannig device is a universal serial bus powered document scanning device ("USB scanning device") having a frame, contact image sensor ("CIS") module, a drive platen, document drive platen bearings, springs, a non-enveloping worm drive assembly that includes a drive motor, a single start worm, and a worm gear, a printed circuit board, and a document sensor. The frame comprises rigid members that include an upper frame member, a lower frame member, and first and second endplate members.

The four-piece frame is configured so that the upper frame member and the lower frame member are opposite to each other and each is connected at their first and second ends to the first endplate member and the second endplate member, respectively. Each endplate member includes a slot where the drive platen rests, as described below.

The CIS module is mounted to the upper frame member using an industrial adhesive. Mounting the CIS module to the upper frame member keeps the CIS module rigid during operation of the USB powered document scanning device.

The drive platen includes a friction surface and includes bearings on each end. As described above, each endplate member includes slots and the slots are longitudinally aligned with respect to the upper frame member and the lower frame member. Within each slot is a spring. The drive platen rests within the slots by resting the bearings of the drive platen on the springs within the slots. In addition, one end of the drive platen includes a worm gear. The drive motor rests on top of one endplate member. The worm gear includes gear teeth and the drive motor includes the single start worm having a helical tooth. The drive platen rests within the slots of the endplate members so that the end of the drive platen having the worm gear is aligned with the endplate member holding the drive motor such that the gear teeth of the worm gear are meshed with the helical tooth of the single start worm of the drive motor.

The printed circuit board is mounted in close proximity to the lower frame member. The printed circuit board includes logic circuitry for operating the USB scanning device, including the worm drive motor and the document sensor. The document sensor, which is coupled to the printed circuit board, is located by a document feed point and senses the presence of a document inserted at the document feed point.

A document is sensed by the document sensor to start operation of the USB scanning device. The document sensor sends a signal to the printed circuit board that, in turn, triggers the drive motor to begin operation. The single start worm, which is movably coupled to the drive motor, starts to rotate so that the helical tooth causes the gear teeth of the worm gear to being moving that, in turn, begins rotating the drive platen. The friction surface of the drive platen grasps the document and aligns the document under the CIS module so that each line of the document may be scanned. As each line is scanned, the drive platen moves the document forward to exit the document from the USB scanning device.

As the document passes through the USB scanning device, bearings of the drive platen move in a substantially longitudinal, or vertical, direction within the slots and with respect to the upper frame member and the lower frame member. As the bearings move, the drive platen moves in the same direction while the CIS module remains securely attached to the upper frame member. Mounting the CIS module to the upper frame member provides a rigid unit that does not twist or torque during operation of the USB scanning device. In addition, mounting the CIS module to the upper frame member also eliminates subsequent binding of the CIS module when the drive platen is rotated to feed a document through the USB scanning device because the surfaces are not "gauged" into one another. Also, mounting the CIS module to the upper frame member allows for a shorter distance to exist between the top of the USB scanning device and the document feed slot that, in turn, provides for a small form factor for the USB scanning device.

In an alternative embodiment, USB scanning device has no frame and the components of the scanning device are assembled directly within a two-part case, using the two-part case itself to provide the necessary structural rigidity. The two-part case of the frameless USB scanning device comprises a front case member and a back case member that couple together when the frameless USB scanning device is fully assembled.

The front case and the back case both include document feed recesses through which a document is passed during scanning. The front case includes the CIS module and the drive platen. Specifically, the CIS module is secured with an industrial adhesive to the upper section of the front case so that the CIS module remains fixed with respect to the front case and the drive platen. Securing the CIS module to the upper section of the front case results in a rigid structure that does not cause the USB scanning device to twist or torque during a scanning operation.

Each side end of the front case includes a longitudinal channel within which a spring resides. Further, one side end of the front case includes the worm drive motor. The drive platen is aligned within the longitudinal slots of the front case so that a large portion of the bearings of the drive platen rest within the slot on top of the springs and the worm gear matches up with the drive motor. Specifically, as described above, the gear teeth of the worm gear are aligned to mesh with the helical tooth of the single start worm attached to the drive motor. The remaining portion of the bearings of the drive platen are enclosed by the back case.

The printed circuit board is mounted along the bottom of the front case with a portion of the circuit board located within the bottom of the second case. The printed circuit board includes circuit logic for operating the first USB powered document scanning device, including the drive motor and a document sensing LED. The document sensing LED, which is coupled to the printed circuit board, is located on the top side of the document feed recess of the front case and triggers the USB scanning device to begin operation once a document is sensed.

The back case includes molded in cable guides which hold cabling for the USB scanning device. Specifically, when the USB scanning device is fully assembled, a USB cable is trapped within the cable guides of the back case. Along with the internal component retention features described, the back case also includes the features for the document exit path.

Mounting the CIS module to the upper section of the front case allows the CIS module to remain rigid during scanning. Further, fixing the CIS module to the front case eliminates binding of the CIS module with the drive platen such that lenses of the CIS module are not gauged into a document on the drive platen. Therefore, the frameless USB scanning device beneficially reduces power consumption because additional torque is unnecessary for scanning the document.

The features and advantages described in this specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

A preferred embodiment of the present invention will be described with reference to the Figures, where like reference numbers indicate identical or functionally similar elements. The present invention includes a document scanning devices that draws power from a peripheral bus that provides parasitic power. The peripheral bus may be a universal serial bus, a system bus coupled to a parallel data port or serial data port, or a peripheral component interconnect (PCI) bus, or the like, for example. In a preferred embodiment, the document scanning device is a device that operates by drawing power from a universal serial bus ("USB"). Universal serial bus devices satisfy their power requirement by drawing their power from the USB port of a computer or other device incorporating USB specifications. The USB port outputs less power compared to standard plug or outlet power sources and, therefore, devices utilizing these ports need to be appropriately designed to account for the decrease in power draw. In a preferred embodiment, the USB scanning device operates on 1 watt of power from 5 volts and 250 milliamps, although a lower power specification may be used. The power draw from a peripheral bus, such as the USB, is further described in co-pending U.S. patent application Ser. No. 08/829,962, entitled "Scanner Powered by Peripheral Bus," as referenced above and hereby incorporated by reference.

Figure 1A:
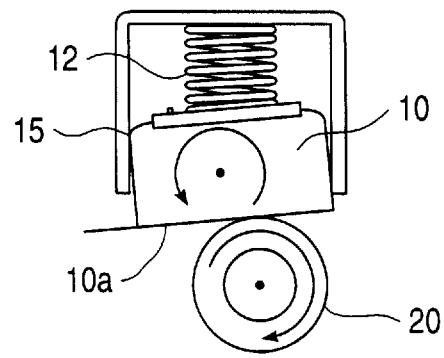
FIG. 1a illustrates a conventional document scanning device having a movably attached CIS module and a document drive roller.
Figure 1B:
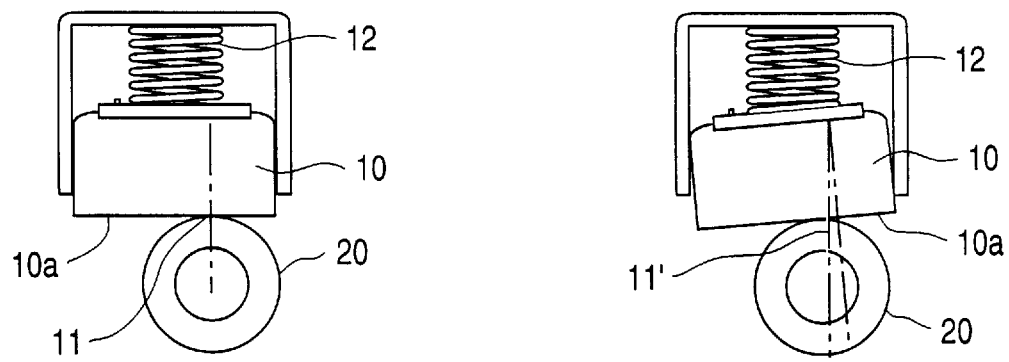
FIG. 1b illustrates a conventional document scanning device where lenses of the CIS module shift away from a desired contract point during scanning.
Figure 1C:
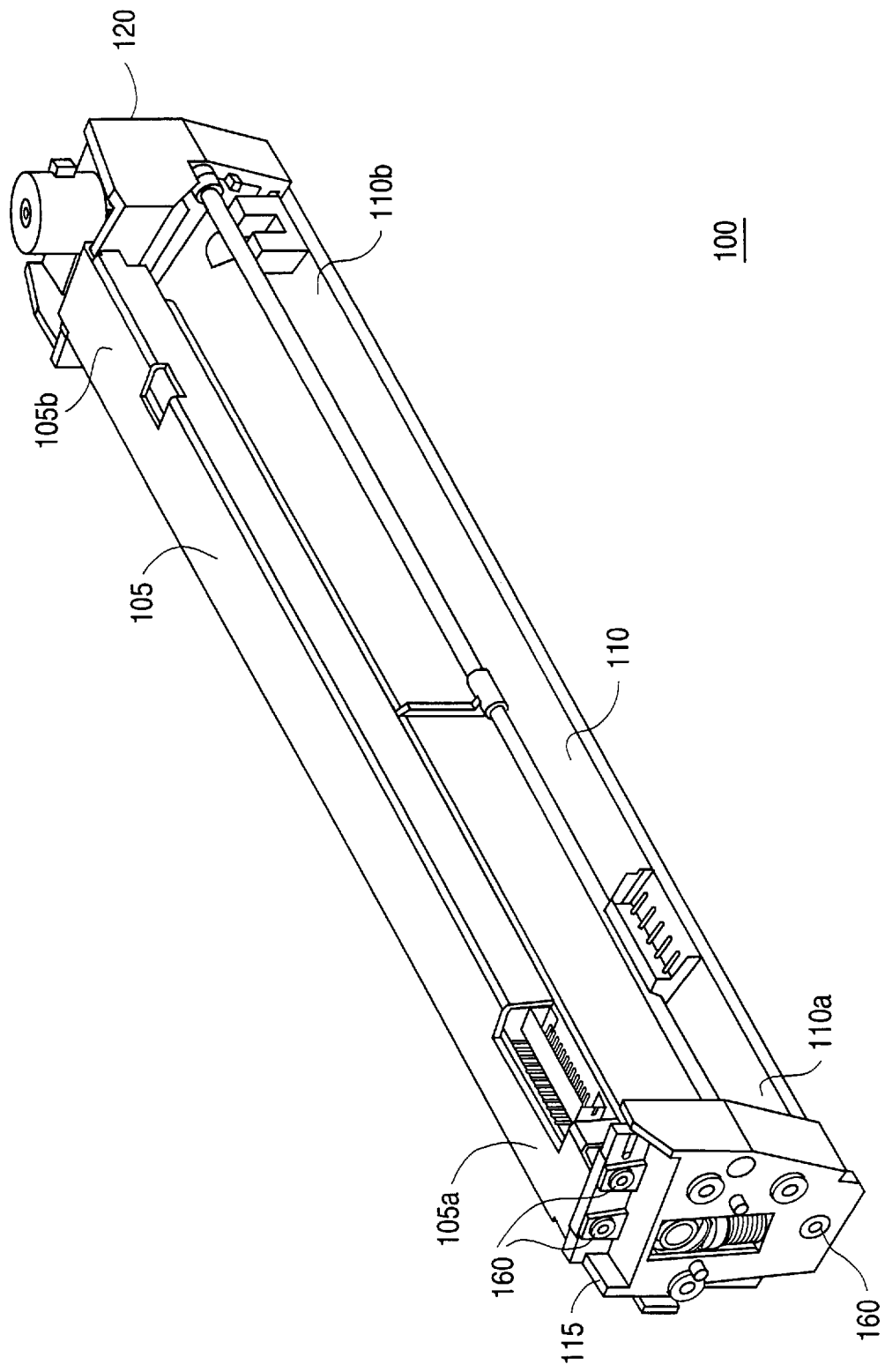
FIG. 1c is an oblique view of a universal serial bus powered document scanning device ("USB scanning device") in accordance with the preferred embodiment of the present invention.

FIG. 1c is an oblique view illustrating the general structure of a universal serial bus powered document scanning device ("USB scanning device") 100 in accordance with the present invention. The USB scanning device 100 comprises a four-piece, or four-part, frame that includes an upper frame member 105, a lower frame member 110, a first endplate, or side, member 115, and a second endplate, or side, member 120. Both the upper frame member 105 and the lower frame member 110 include a first side 105a, 110a and a second side 105b, 100b. In addition, the upper frame member 105 includes a channel as further described in FIG. 2. In the preferred embodiment, the upper frame member 105 and the lower frame member 110 are constructed from metal. In an alternative embodiment, the upper frame member 105 and the lower frame member 110 are constructed from another rigid material such as a high strength plastic, for example. In addition, in the preferred embodiment, the first and the second endplate members 115, 120 are constructed from a material comprising a glass-filled polycarbonate. In an alternative embodiment, the first and the second endplate members 115, 120 may be constructed from another rigid material such as a stamped metal composition, or an acrylonitrile-butadrene-styrene ("ABS") polycarbonate blend, for example.

The first side 105a of the upper frame member 105 is coupled to the first endplate member 115 through at least one fastener 160. The second side 105b of the upper frame member 105 is coupled to the second endplate member 120 through at least one fastener 160. Similarly, the first side 110a of the lower frame member 110 is coupled to the first endplate member 115 through at least one fastener 160. The second side 110b of the lower frame member 110 is coupled to the second endplate member 120 through at least one fastener 160. The upper frame member 105 is coupled to the endplate members such that the channel faces the lower frame member. In a preferred embodiment, the fasteners 160 are threaded screws. In an alternative embodiment the fasteners 160 may be rivets or clips, for example.

The first and the second endplate members 115, 120 also include alignment pins 176 and one or more case fastener holes 177. These elements 176, 177 beneficially allow for the USB scanning device 100 to be fitted within custom-built scanning device housings.

Figure 2:
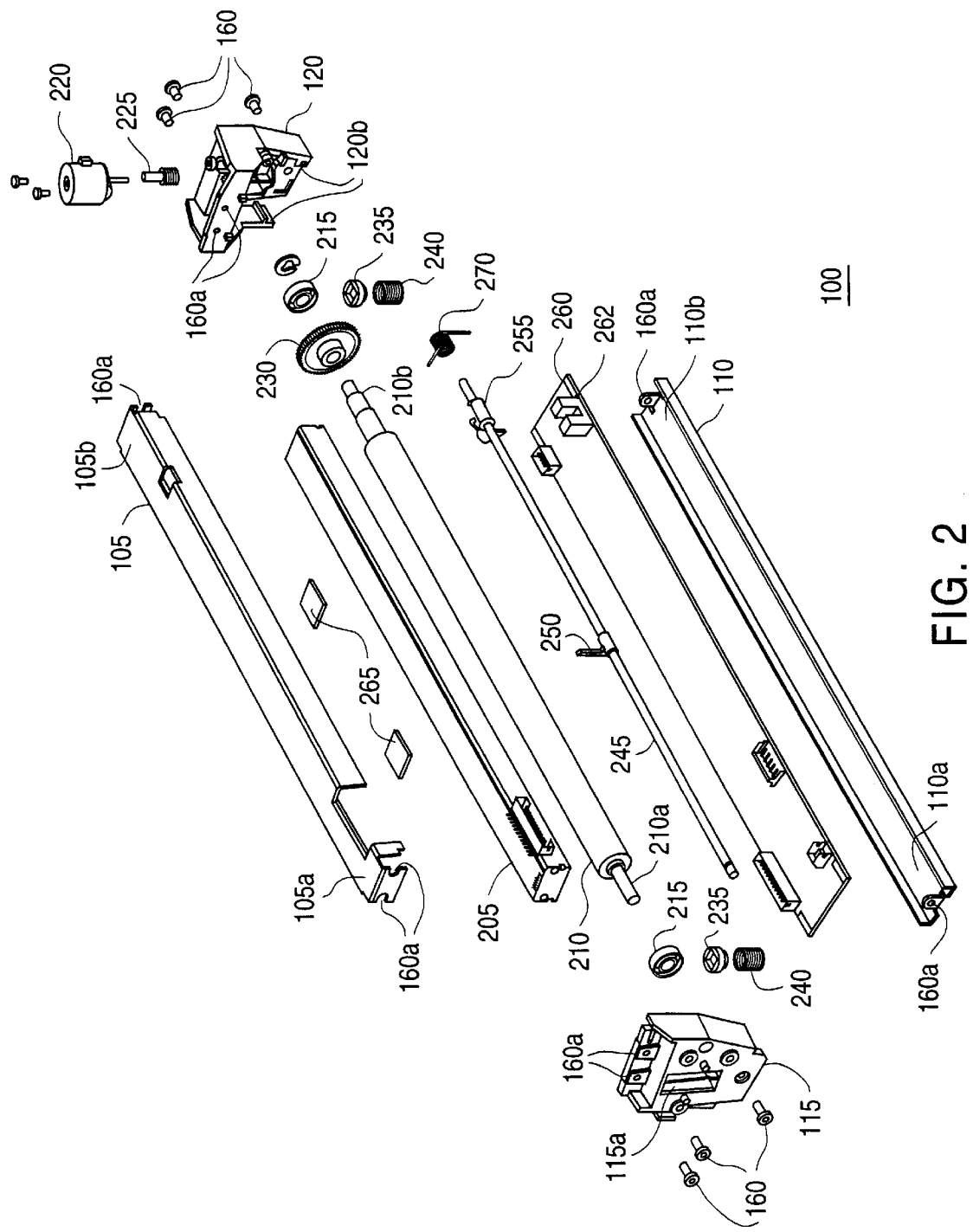
FIG. 2 is an exploded view of the USB scanning device in accordance with the preferred embodiment of the present invention.

FIG. 2 is an exploded view of the USB scanning device 100 in accordance with the present invention. Specifically, the USB scanning device 100 includes the upper frame member 105, the lower frame member 110, the first endplate member 115, and the second endplate member 120, as described above in FIG. 1c. In addition, the USB scanning device 100 also includes a contact image sensor ("CIS") module 205, a document drive platen, or roller, 210, bearings 215, bearing rests 235, spring element 240, a worm drive assembly, including a drive motor 220, a single start worm 225, and a worm gear 230, a document flag rod 245, and a printed circuit board 260.

The upper frame member 105, the lower frame member 110, the first endplate member 115, and the second endplate member 120, are coupled as described above in FIG. 1c. Specifically, FIG. 2 illustrates fastener attachment points 160a for the upper frame member 105, the lower frame member 110, the first endplate member 115, and the second endplate member 120.

The channel of the upper frame member 105 is where the CIS module 205 fits. Specifically, a backing of the CIS module 205 is attached to the upper frame member 105 through the use of one or more adhesive pads 265, for example, while the face, where the image sensing lenses are located, generally points in the direction of, and is exposed towards, the drive platen 210 of the USB scanning device 100. In an alternative embodiment, the CIS module 205 may be coupled to the upper frame member 105 through other retention components such as plastic retaining ribs, for example. Alignment tabs 206a, 206b located on each endplate member 115, 120 prevent the CIS module 205 from sliding forward or backward. The bottom of channel of the upper frame member 105 prevents the CIS module 205 from rotating during scanning and helps to ensure that the CIS module 205 remains rigid during a scanning operation. In an alternative embodiment, the CIS module 205 may be attached to the upper frame member 105 through a fastener such as a screw, a rivet, a clip, or the like, for example. The CIS module 205 is a commercially available CIS module, such as a Mitsubishi G3R216LT available from Mitsubishi Electric Corporation of Japan.

Each endplate member 115, 120 includes a slot 115a, 120a (not shown in FIG. 2 for the second endplate member 120). Each slot 115a, 120a is longitudinally configured with a bottom by the lower frame brace member 110 and a top by the upper frame brace member 105. A spring 240 rests at the bottom of each slot 115a, 120a. The bearing rest 235 lies on top of each spring 240. In one embodiment, the spring element 240 within each slot 115a, 120a of each endplate member 115, 120 is of the same resiliency. In an alternative embodiment the spring element 240 within the slot 120a of the second endplate member 120 is a low force spring while the spring element 240 within the slot 115a of the first endplate member is a high force spring. Moreover, in an alternative embodiment, the spring element 240 may be a compression element such as a resilient plastic or a flat spring, for example.

The drive motor 220 is coupled to the top of the second endplate member 120. The single start worm 225 is coupled to, and extends from a shaft, of the drive motor 220 and drops along the inside of the second endplate member 120 (shown in FIG. 3). Further, the end of the single start worm 225 includes a helical tooth 510 along its outer circumference, which is further discussed below with respect to FIGS. 5 through 9.

A large portion of the drive platen 210 is comprised of a friction surface that can grip an object such as a document. In the preferred embodiment, the friction surface is a rubber surface. In an alternative embodiment, the drive platen 210 may be a friction surface such as a silicone surface, for example. In addition, the drive platen 210 includes a first end 210a and a second end 210b. The worm gear 230 is rotatably coupled to the drive platen 210 at the second end 210b. The bearings 215 are rotatably coupled to the drive platen 210 at both the first end 210a and the second end 210b. In one embodiment, the worm gear 230 has a diameter that is larger than the bearing 215 coupled to the second end 210b of the drive platen 210. In an alternative embodiment, the worm gear 230 has a diameter smaller or equal to the bearings 215. In addition, the worm gear 230 includes helical gear teeth 520 along its circumference that are further discussed below with respect to FIGS. 5 through 9.

The drive platen is aligned within the assembly so that the bearings 215 at the first end 210a of the drive platen 210 fit within the slot 115a of the first endplate member 115 and comes to rest on top of the bearing rests 235. The second end 210b of the drive platen 230 fits within the slot 120a of the second endplate member 120 and comes to rest on top of the bearing rests 235. In an alternative embodiment, the bearings 215 may lie directly on top of the spring element 240. In addition, the worm gear 230 is movably coupled to the second end 210b of the drive platen 210 and is aligned so that the gear teeth 520 of the worm drive gear 230 mesh with the helical tooth 510 of the single start worm 225 as is further described below in FIGS. 5 through 9.

The document flag rod 245 includes at least one document arm 250, the document flag 255, and document flag reset spring 270. In one embodiment, a document flag arm 250 is located at the center of the document flag rod 245 and the document flag 255 is located at one end of the document flag rod 245. In close proximity to the document flag 255 is the document flag reset spring 270. The document flag rod 245 is rotatably coupled to the first endplate member 115 and the second endplate member 120. In an alternative embodiment, the document flag assembly 245, 250, 255 may be substituted with any document detection scheme where a document may be detected such as an light emitting diode sensor, for example.

The printed circuit board 260 includes circuit logic for operating the USB scanning device 100. Among the circuit logic on the printed circuit board 260 is a sensor 262 that is aligned with the document flag 255 and whose operation is further described below. The printed circuit board 260 includes a first end and a second end. The first end is coupled to a circuit board slot 115b (not shown in FIG. 2) of the first endplate member 115 and the second end is coupled to a circuit board slot 120b of the second endplate member 120. One embodiment of the printed circuit board 260 is described in co-pending U.S. patent application Ser. No. 08/829,962, entitled "Scanner Powered by Peripheral Bus," as referenced above and hereby incorporated by reference.

Figure 3A:
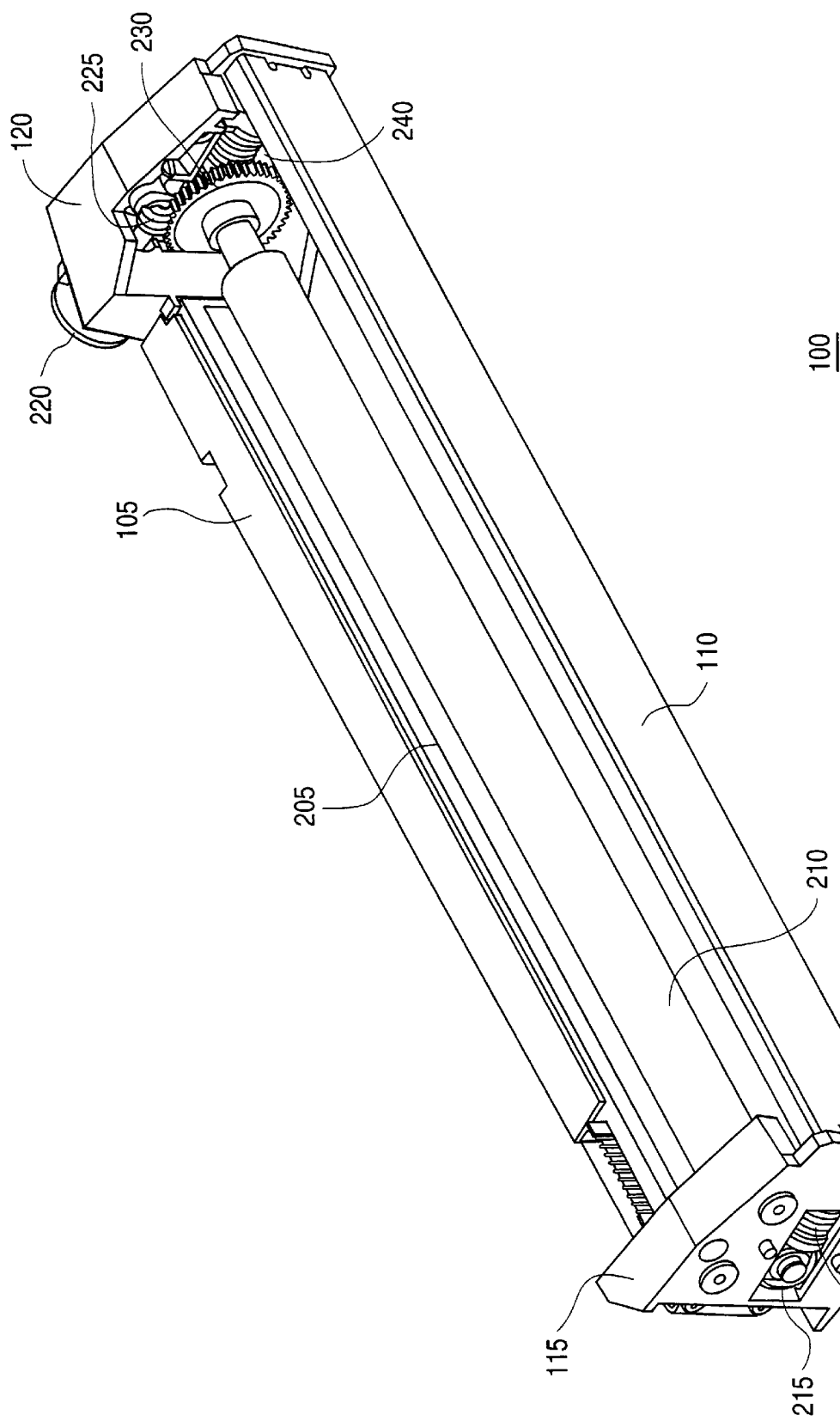
FIG. 3a is an oblique view of a partially assembled USB scanning device from a lower frame member perspective in accordance with the preferred embodiment of the present invention.

FIG. 3a is an oblique view into a partially assembled USB scanning device 100 from the lower frame member 110 perspective in accordance with the present invention. For example, FIG. 3a illustrates the bearings 215 at the first end 210a of the drive platen 210 fitting into the slot 115a of the first endplate member 115 and resting on the spring 240 within the slot 115a. Also shown is the worm drive gear 230 at the second end 210b of the drive platen 210 fitting within the second endplate member 120 so that its teeth mesh with the helical tooth of the single start worm 225 that is also within the second endplate member 120. The upper frame member 105 is illustrated holding the CIS module 205, within the channel of the upper frame member 105, with the face having the lenses of the CIS module 205 exposed towards the friction surface of the drive platen 210.

Figure 3B:
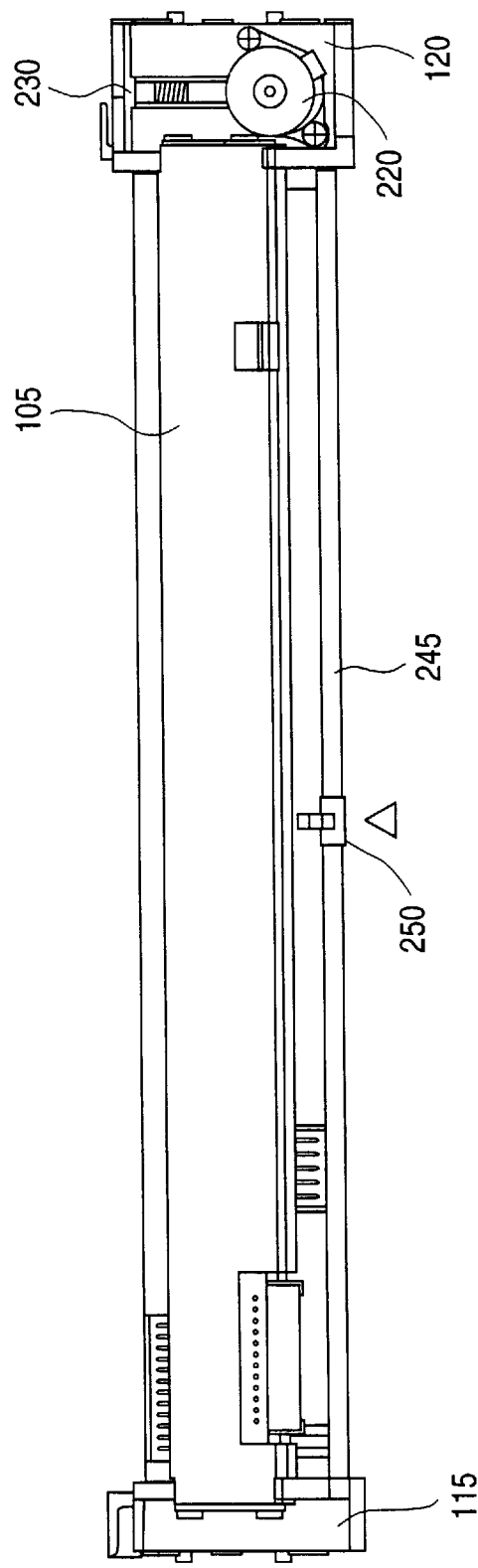
FIG. 3b is a top view of an assembled USB scanning device in accordance with the preferred embodiment of the present invention.

FIG. 3b is a top view of an assembled USB scanning device 100. Specifically, FIG. 3b shows the upper frame member 105, the first endplate member 115, second endplate member 120, the document flag rod 245, the drive motor 220, and the worm gear 230. The front of the assembled USB scanning device 100 is where the document flag rod 245 is located.

In one embodiment, the USB scanning device 100 may be started with a switch (not shown). In an alternative embodiment, the USB scanning device 100 may be started automatically by triggering the document flag 255. Generally, when the USB scanning device 100 begins operation, a document is inserted through the front of the USB scanning device 100 near the document flag rod 245. The document comes in contact with the document arm 250 so that the document arm 250 rotates the document flag rod 245 and creates a tension in the document flag reset spring 270. Rotation of the document flag rod 245 rotates the document flag 255 and triggers the sensor 262. The sensor 262 relays a signal to the circuit logic of the printed circuit board 260 that, in turn, starts the drive motor 220. The drive motor 220 rotates the single start worm 225 to rotate the worm gear 230 to rotate as further described in FIGS. 5 through 9. Rotation of the worm gear 230 rotates the drive platen 210. The drive platen 210 rotates in a clockwise direction, when viewed from the second endplate member 120 perspective where the drive motor 220 rests, to draw in the document under the lenses of the CIS module 205.

As the document passes under the lenses of the CIS module 205, the drive platen 210 moves substantially in a longitudinal direction with respect to the endplate members 115, 120. Specifically, the bearings 215 move within the slots 115a, 120a substantially in a longitudinal, or up and down, direction on the bearing rests 235 and springs 240. As the bearings 215 move in a substantially longitudinal direction within the slots 115a, 120a, the drive platen 210 also moves in this direction as the document passes through the USB scanning device 100. Moreover, the drive platen 210 moves in the substantially longitudinal direction with respect to the four-piece frame 105, 110, 115, 120 and the CIS module 205, which all remain fixed.

The fixed CIS module 205 scans the document as it passes under the lenses so that image data is generated. When the document exits the USB scanning device 100 the tension in the document flag reset spring 270 is released so that the document arm 250 rotates back to its start position by rotating the document flag rod 245 back to its start position. As the document flag rod 245 returns to its start position, the document flag 255 disengages the sensor 262. The drive motor 220 continues to stay on for at least a portion of a revolution of the drive platen 210 before turning off so that the document can be passed completely through the USB scanning device 100.

The design of the USB scanning device 100 provides several advantages and benefits. For example, fixing the CIS module 205 to the upper frame member 105 creates a rigid member as described above. The rigid member eliminates torque twisting and subsequent binding of the CIS module 205 when the drive platen 210 is rotated during a document feed. Moreover, because the CIS module 205 is secured to the upper frame member 105, it does not succumb to a wedging effect. That is, the CIS module 205 does not move relative to the four-piece frame and thus does not become wedged into the frame when the document is scanned. Thus, greater torque, and therefore more power, is not necessary to overcome a wedging effect. Further, because the CIS module 205 remains fixed, the lenses of the CIS module remain properly aligned with the drive platen so that there is no degradation of scanning quality as the document is scanned. Therefore, the present invention maximizes torque while minimizing power consumption and keeping high scanning quality.

Another advantage of the present invention is that rigidly mounting the CIS module 205 to the upper frame member 105 provides for a small distance to exist between the top of the USB scanning device 100 and the document entry slot. Therefore, the USB scanning device 100 can be manufactured with reduced dimensions so that there is an overall small form factor for an assembled USB scanning device 100.

Figure 4:
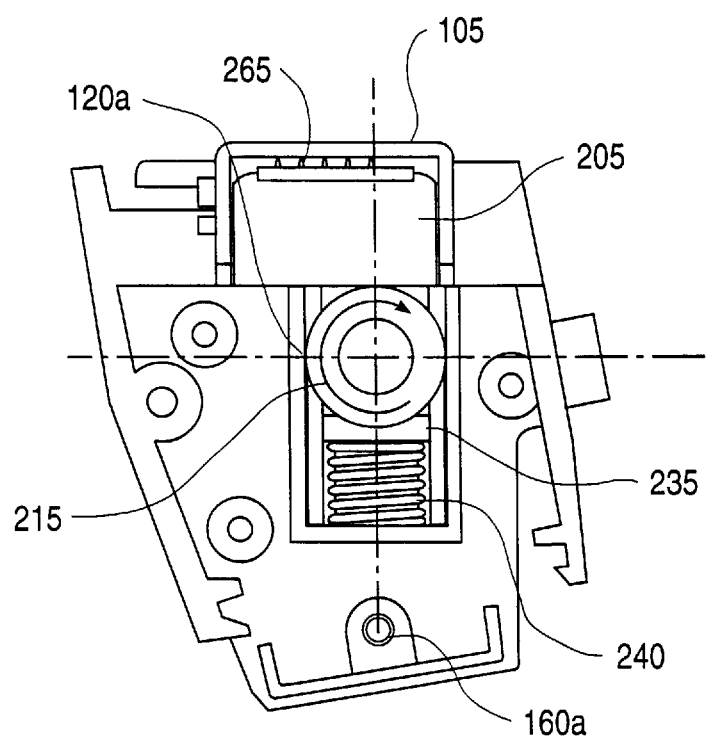
FIG. 4 illustrates interactions between various components of a USB scanning device from a cross-section of a second endplate member perspective in accordance with the preferred embodiment of the present invention.

FIG. 4 illustrates from the second endplate member 120 perspective interactions between various components of the USB scanning device 100. The CIS module 205 is secured within the channel of the upper frame member 105. The slots 115a 120a of the first and the second endplate members 115, 120 are longitudinally positioned and are aligned so that when the bearings 215 of the drive platen 210 are placed within, the center of the diameters of the bearing 215 and the drive platen 210 are aligned with the center of the lenses of the CIS module 205. Moreover, the drive platen 210 is movably coupled with respect to the four-piece frame 105, 110, 115, 120 because the bearings 215 rest on the spring elements 240 within the slots 115a, 120a of the first and the second endplate members 115, 120. The spring elements 240 on which the bearings 215 rest help urge the drive platen 215 towards the lenses of the CIS module 205, yet provide sufficient resiliency to allow the bearings 215 to move longitudinally within the slot 115a, 120a so that the drive platen 210 can appropriately adjust when a document comes between the lenses of the CIS module 205 and the drive platen 210.

An advantage of the present invention is that when the drive platen 210 rotates a torque is applied to the CIS module 205 that results in a tendency for the CIS module 205 to rotate. Because the CIS module 205 remains fixed and does not rotate, the center of the lenses of the CIS module 205 remain in contact with the document moving along the drive platen 210 so that a high quality document scan is attained.

Further, the walls of each slot 115a, 120a of the first and the second endplate members 115, 120 are elongated in the longitudinal direction as described above, and also serve as guides for the bearings 215 of the drive platen 210. The walls of each slot 115, 120a serve as guides for the bearings 215, but do not need to be highly precise because the drive platen 210 moves towards the worm drive motor 220 when a torque is applied to the drive platen 210. A reaction force on the drive platen 210 is opposite to a force generated at the interface of the CIS module 205 and the drive platen 210 so that the reaction force removes any space between the bearings 215 and the walls of the slot 115a, 120a as the document is fed through the USB scanning device 100. The reaction force improves a centerline alignment between the lenses of the CIS module 205 and the center of the diameter of the drive platen 210, thereby improving the quality of a document scan.

In the preferred embodiment the bearings 215 are plastic roller bearings. Plastic roller bearings reduce torque and thus, reduce the power required by the document feed mechanisms. Moreover, because plastic roller bearings have increased diametrical clearance compared to other ball bearings, plastic roller bearings allow for slight misalignment of the endplate members 115, 120 during assembly or operation of the USB scanning device 100 without introducing additional drag on the scanning device that would result in greater power consumption during a scanning operation. Further, because a higher degree of alignment precision is unnecessary with plastic roller bearings, overall manufacturing costs are also reduced.

It is noted that in an alternative embodiment the bearings may be metal raced bearings, roller bearings, or rubber bearings, for example. In addition, the bearings may be substituted with any roller assembly that allows the drive platen 210 to be rotated along its horizontal axis and that permits longitudinal movement within the slots 115a, 120a of each endplate member 115, 120.

The present invention beneficially reduces power consumption because additional torque is not necessary when the USB scanning device scans a document. To further reduce power consumption and make the USB scanning device more efficient, the worm drive assembly, comprising the worm drive motor 220, the single start worm 225 and the worm gear 230, are designed as described below.

Figure 5:
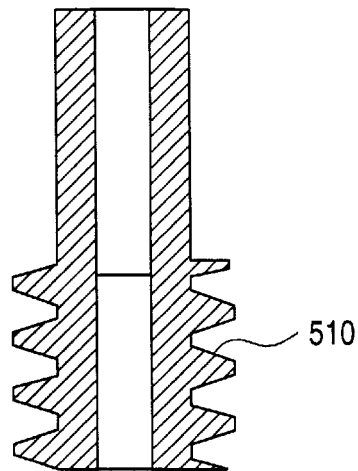
FIG. 5 illustrates one embodiment of a single start worm with a helical tooth in accordance with the preferred embodiment of the present invention.

FIG. 5 illustrates one embodiment of the single start worm 225 in accordance with the present invention. As described above, the single start worm 225 includes a helical tooth 510. In a preferred embodiment the single start worm 225 is a Acme thread similar to a screw. Further, the top portion of the single start worm 225 is coupled to the drive motor 220 so that it is vertically moveable with respect to the drive motor 220. The bottom part of the single start worm 225 is where the helical tooth 510 is configured to mesh with the gear teeth 520 of the worm gear 230.

Figure 6:
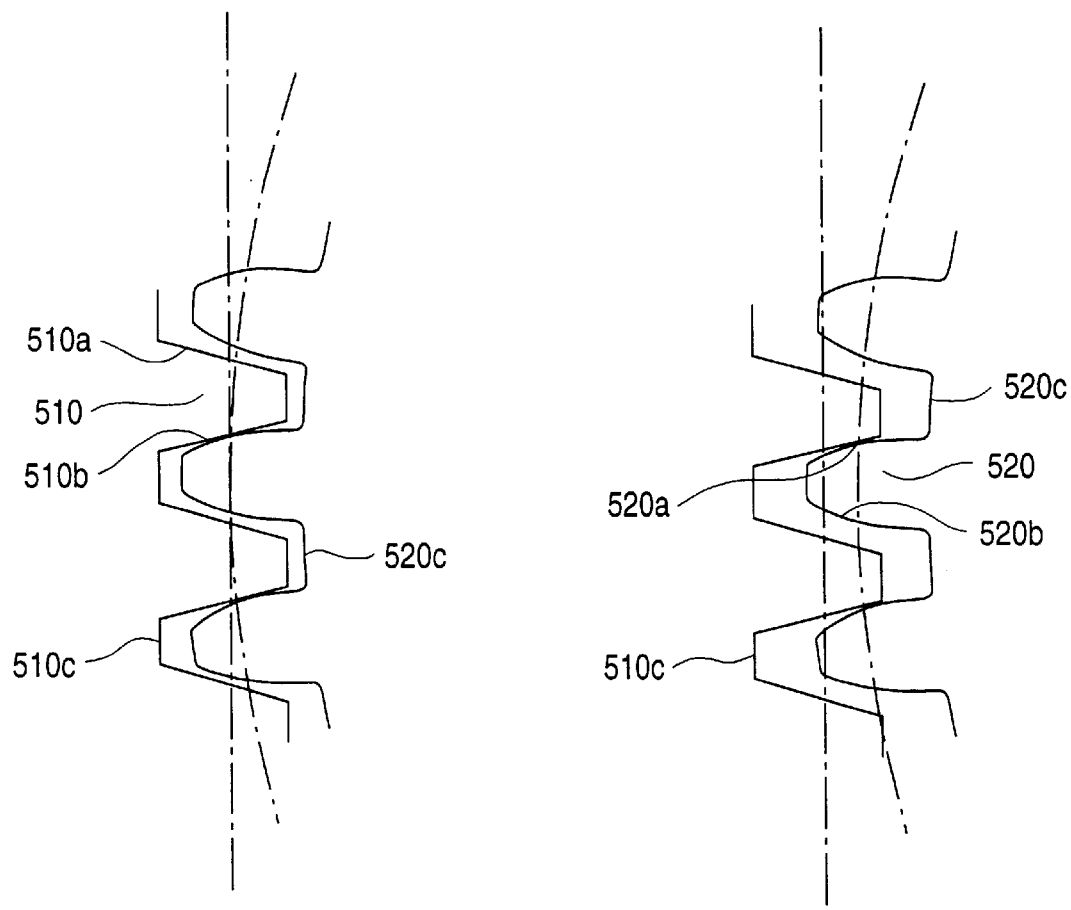
FIG. 6 is a partial view of meshing of the helical tooth of a single start worm with gear teeth of a worm gear.

FIG. 6 is a partial view illustrating a helical tooth 510 of the single start worm 225 meshing with helical gear teeth 520 of the worm gear 230. The helical tooth 510 include flat surfaces 510a, 510b and the gear teeth 520 include slightly curved surfaces 520*a*, 520*b*. The flat surfaces 510*a*, 510*b* of the helical tooth 510 allows for a center distance between a pitch diameter of the single start worm 225 and a pitch diameter of the worm gear 230 to vary slightly without altering a conjugate action between the two components 225, 230. Meshing the single start worm 225 and the worm gear 230 in this manner prevents jamming of the helical tooth 510 into a root 520*c* of the gear teeth 520 of the worm gear 230. Moreover, this configuration reduces losses by ensuring that both sides of the helical tooth of the single start worm 225 never contact both of the opposite sides of any two gear teeth on the worm gear 230. Thus, only a single point of contact can exist causing all available torque to be transmitted to the working surface of a working tooth of the gear teeth of the worm gear 230. Therefore, this configuration reduces the power required by the drive motor 220.

It is noted that the single start worm 225 is constructed from Delrin CL, which is a chemically lubricated composite material, or from Tercite, which is a material from Shambam, Inc. of Newbury Park, Calif., or other similar compounds. Similarly, the worm gear 230 is also constructed from materials such as Delrin CL, Tercite, or the like.

Figure 7:
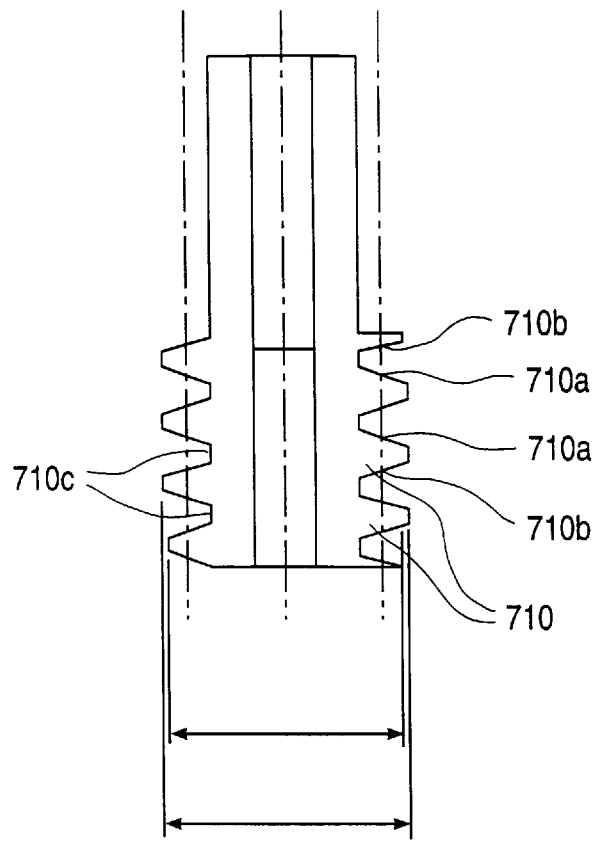
FIG. 7 illustrates another embodiment of a single start worm with a helical tooth in accordance with the preferred embodiment of the present invention.

FIG. 7 illustrates another embodiment of the single start worm 225 in accordance with the present invention. In this embodiment a helical tooth 710 is narrower than a root 710*c* and there is a wider gap between successive surfaces 710*a*, 710*b* of the helical tooth 710. Further, the outside diameter of the portion of the single start worm 225 where the helical tooth 710 is located has a larger diameter so that there is a more pronounced depth between the tip of a tooth and the root of a tooth of the helical tooth 710. This configuration creates a narrow tooth profile that advantageously provides a single point contact conjugate mesh with high backlash that eliminates all losses due to interference from non-working surface, while allowing center-to-center distances between the helical tooth 710 and a working gear tooth of the gear teeth of the worm gear to vary without the teeth losing mesh. As discussed above, this design eliminates losses due to interference from non-working surfaces.

Figure 8A:
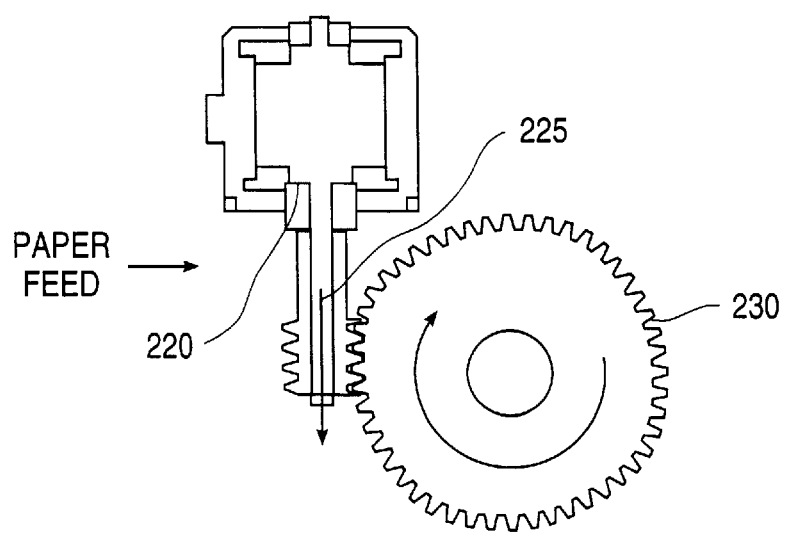
FIG. 8a is a view illustrating a single start worm attached to a drive motor meshing with a worm gear in accordance with the preferred embodiment of the present invention.

FIG. 8*a* is a view illustrating a single start worm meshing with a worm gear in accordance with the present invention. In the preferred embodiment, the drive motor 220 of the worm drive assembly is a step motor which can have its motor stopped with current applied without chance of damage to the motor, which increases the overall reliability of the drive system. Further, because the drive motor 220 is a step motor, the number of steps taken is predetermined and may be used to determine the amount the drive platen 210 can be rotated because the revolutions that the single start worm 225 takes can be pre-determined. In turn, this information can help determine the number of rotations of the worm gear 230. Thus, the system can determine what is the next scanned line of a document. In the preferred embodiment, the drive motor 220 is a 1 watt low power 20-step motor, the drive platen 210 has a diameter of 12.94 mm, and the worm gear 230 has a 48:1 ratio so that one step of the drive motor 220 provides document movement of $\frac{1}{600}$th of an inch. The power requirements for the worm drive assembly is further described in a co-pending U.S. patent application Ser. No. 08/829,962, entitled "Scanner Powered by Peripheral Bus," as referenced above and hereby incorporated by reference.

The single point contact between the helical gear teeth of the worm gear 230 and the helical tooth of the single start worm 225 causes an axial force to be generated in the drive motor 220 shaft in a downward direction towards the single start worm 225. This force keeps the rotor of the worm drive motor 220 in contact against the lower bearing thrust surface. When rotation of the drive motor 220 is paused during a document feed, the force of gravity retains the rotor in this biased position resulting in no disruption in the movement of the document upon startup of the document feed. The detent torque of the drive motor 220 and the high friction at the interface where the drive platen 210 and the CIS module 205 meet prevents movement of the entire USB scanning device 100 while it is paused when the document is fed through the USB scanning device 100.

The worm drive assembly, including the drive motor 220, the single start worm 225, and the worm gear 230, further increases the efficiency of the USB scanning device 100. The drive motor 220 is a single start helical worm and provides for very high reduction ratios in the minimum amount of space with the minimum number of parts. Further, the single start worm 225 is made from a low coefficient of friction, self lubricating material, and uses a helical tooth design that helps increase the overall efficiency of the USB scanning device 100.

The single point conjugate mesh between the helical tooth of the single start worm 225 and the helical gear teeth of the worm gear 230 reduces the need for a high precision assembly, as is required by conventional enveloping worm gear assemblies. Specifically, the worm gear 230 may move along the horizontal axial direction of the drive platen 210 relative to the drive motor 220 and the single start worm 225 and still maintain sufficient point contact between the helical teeth of the single start worm 225 and the helical gear teeth of the worm gear 230 so that the worm gear 230 can rotate the drive platen 210. Thus, the USB scanning device 100 may be produced at a lower cost because additional alignments are not necessary after assembly.

Figure 8B:
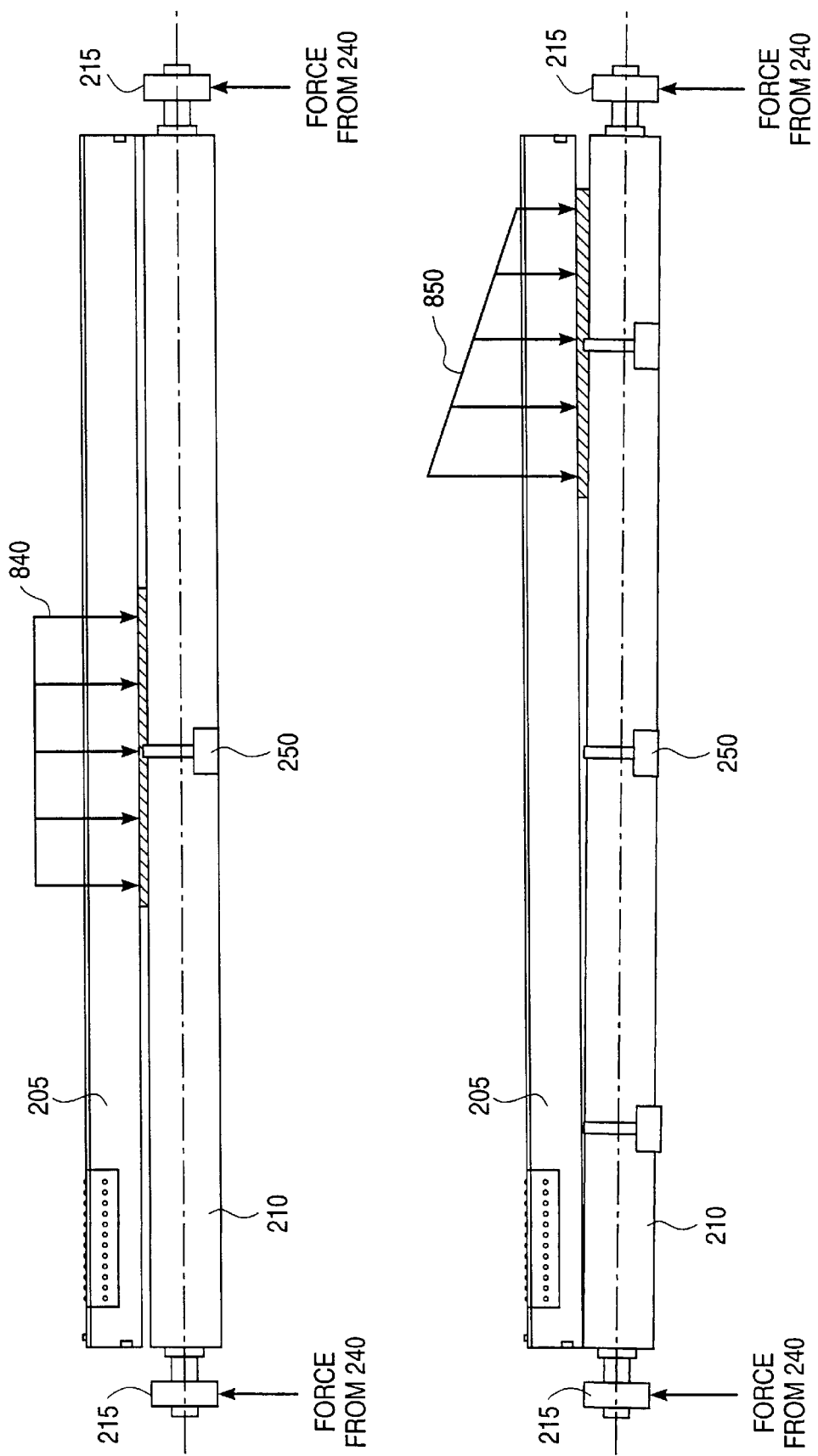
FIG. 8b is a diagram illustrating the center feed feature in accordance with the present invention.

FIG. 8*b* illustrates a center feed feature of the paper feed path in accordance with the present invention. The center feed feature, where a document is passed through the document flag arm 250, is advantageous because it reduces the torque required to feed narrow documents. The center feed feature applies a force 840 along a center area of the drive platen 210 to allow a document to pass without skewing. This configuration also balances the drive platen 210 of the USB scanning device 100 so that the drive platen 210 does not tip at an end opposite the document. Further, the balance of the drive platen 210 prevents the forces 850 acting on narrow documents from biasing the document and creating skew causing an inaccurately scanned image. The center feed also prevents the ends of the drive platen 210 from dragging on the exposed lenses of the CIS module 205, thereby decreasing torque requirements and minimizing the noise produced by the USB scanning device 100.

Figure 9:
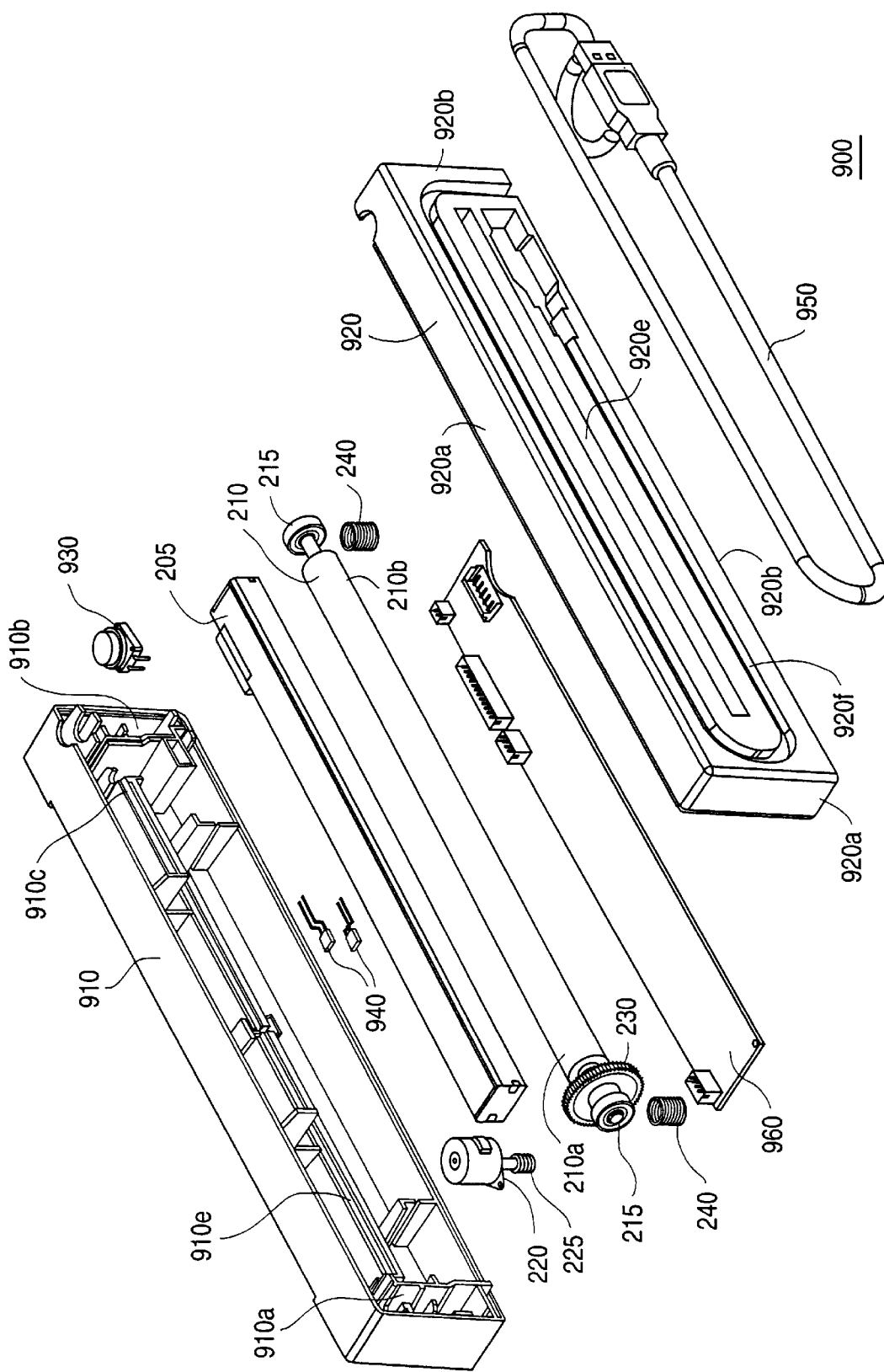
FIG. 9 is an exploded view of a frameless USB scanning device in accordance with an alternative embodiment of the present invention.

FIG. 9 is an exploded view of a frameless USB powered document scanning device ("frameless USB scanning device") 900 in accordance with the present invention. The frameless USB scanning device 900 includes a two-piece structure 910, 920 and does not have a separate frame to hold the components of the scanning device. The frameless USB scanning device 900 also includes the CIS module 205, the drive platen 210, platen bearings 215, springs 240, bearing rests 235, the non-enveloping worm drive assembly 220, 225, 230, a scanner switch 930, a printed circuit board 960, and a document sensing light emitting diode ("LED") 940. The CIS module 205, the drive platen 210, the bearings 215, the springs 240, the bearing rests 235, the non-enveloping worm drive assembly 220, 225, 230, and the printed circuit board 960 are functionally similar to the same components described above.

The two-piece package comprises a front case 910 and a back case 920, both of which are open along internal face areas and that couple together when the frameless USB scanning device 900 is fully assembled. The front case 910 and the back case 920 include a first end 910a, 920a and a second end 910b, 920b. The front case 910 includes a channel along a length of its upper section 910c, two circuit board slots located at its lower section 910d, a channel just inside its first end 910a, and a channel just inside its second end 910b. The back case 920 includes a cable recess 920f where the cabling 950 for the frameless USB scanning device 900 is placed. The back case 920 also includes channels for housing some of the frameless USB scanning device 900 components, as is further described below. Both the front case 910 and the back case 920 include document feed recesses 910e, 920e through which a document is passed during scanning.

The CIS module 205 is attached to the front case 910 along the channel of the upper section 910c. Specifically, the CIS module 205 is attached to the front case 910 with an industrial adhesive so that the CIS module 205 remains fixed with respect to the front case 910 and the back case 920. In an alternative embodiment, the CIS module 205 may be coupled to the upper section 910c using other retention schemes such as plastic retaining ribs that are part of the front case 910. Securing the CIS module 205 to the upper section 910c of the front case 910 results in a rigid structure that prevents the frameless USB scanning device 900 from twisting or torquing when scanning.

Similar to the drive platen described above, the drive platen 210 of the frameless USB scanning device 900 includes bearings 215 at a first end 210a and a second end 210b. As described above, just within each end 910a, 910b of the front case is a channel. Within each channel is a spring 240. The bearings 215 of the drive platen 210 rest on top of the bearing within the channel on each end 910a, 910b of the front case 910. In an alternative embodiment the bearings 215 rest directly on top of the springs 240. Because the channels on each end 910a, 910b of the front case 910 run in a longitudinal, or an up and down, direction (from the lower section 910d to the upper section 910c of the front case), the bearings 215 can move in this direction when they are placed on the bearing rests 235. Thus, the drive platen 210 may move in the longitudinal direction with respect to the front case 910.

The worm drive assembly is comprised of the worm drive motor 220, the single start worm 225, and the worm gear 230. The single start worm 225 is coupled to the drive motor 220. Further, the single start worm 230 includes a helical tooth. The worm gear 230 is coupled to the first end 210a of the drive platen 210. The worm gear 230 includes helical gear teeth along its circumference. The drive motor 220 rests in a slot by the upper section 910c of the front case 910, within the channel of the first end 910a of the front case 910. The single start worm 225 drops down from the drive motor 220 towards the lower section 910d of the front case 910. The bearings 215 of the drive platen 210 are positioned within the channels on each side 910a, 910b of the first case so that the gear teeth of the worm gear 230 are meshed with the helical tooth of the single start worm 225.

The printed circuit board 960 is mounted on the circuit board slots located along the lower section 910d of the front case 910. The printed circuit board 960 includes circuit logic for operating the frameless USB scanning device 900, including the worm drive assembly 220, 225, 230 and the document sensing LED 940. One embodiment of the printed circuit board 960 is described in co-pending U.S. patent application Ser. No. 08/829,962, entitled "Scanner Powered by Peripheral Bus," as referenced above and hereby incorporated by reference. The document sensing LED 940, which is coupled to the printed circuit board, is located on the top edge of the document feed recess 910e of the front case 910.

The back case 920 includes cable recess 920f that holds the cables comprising the USB cable 950 for the frameless USB scanning device 900. Further, the back case 920 includes channels along the first end 920a and the second end 920b, as well as along an upper section 920c and bottom section 920d, so that portions of the CIS module 205, the document platen 210 and associated components 215, 230, and the printed circuit board 960 can reside within the back case 920. Along with the internal component retention features described, the back case 920 also includes the features for the document exit path, such as a document recess 920e.

Figure 10:
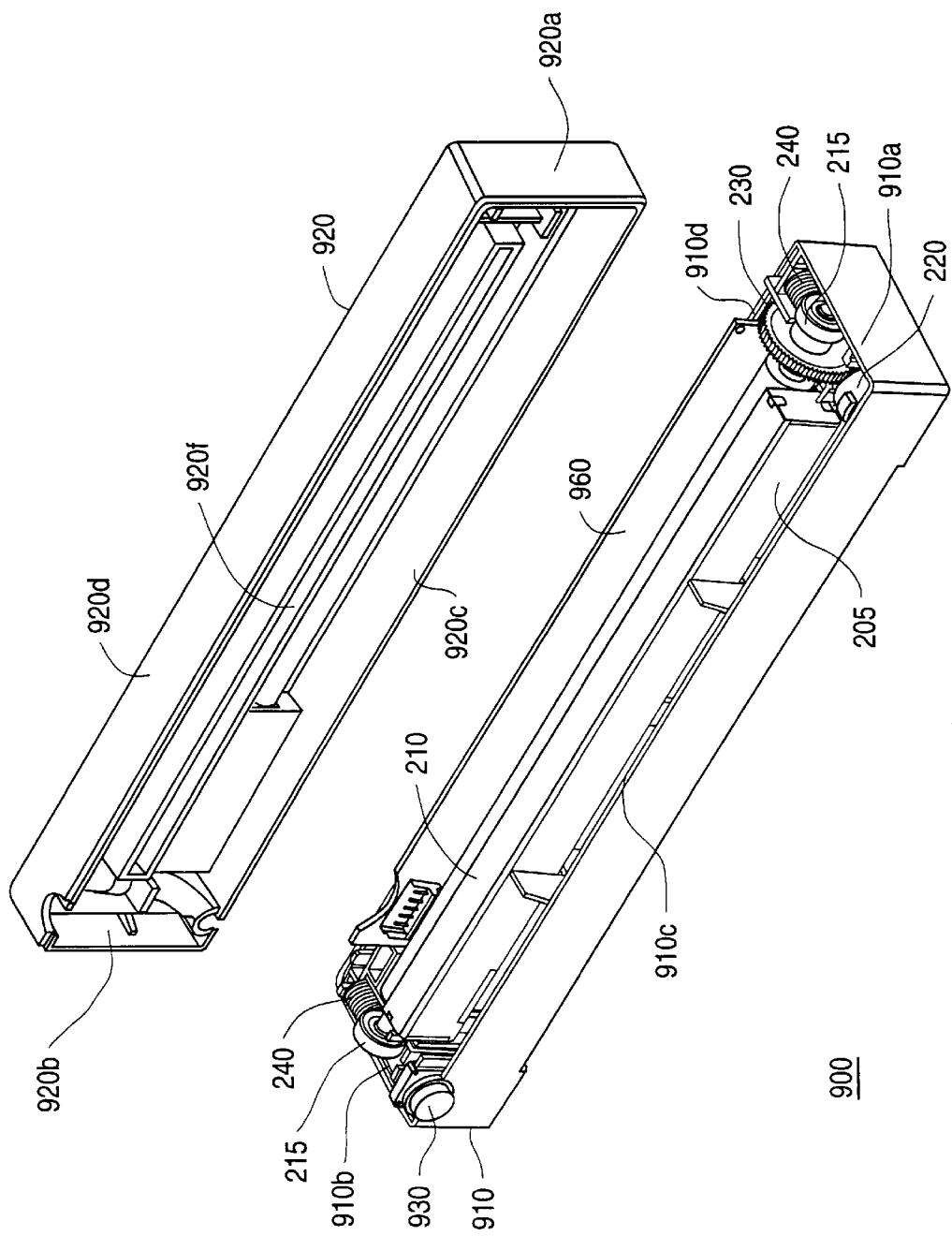
FIG. 10 is an open view of a frameless USB scanning device in accordance with an alternative embodiment of the present invention.

FIG. 10 is an open view of a frameless USB scanning device in accordance with the present invention. Some features and components of the frameless USB scanning device 900 are shown fitted together within the first case 910. The CIS module 205 is securely attached to the upper section 910c of the first case 910, the bearings 215 of the drive platen 210 are rested on the springs 240, the worm drive assembly 220, 225, 230 is coupled together such that the helical tooth of the single start worm 225 would mesh with the helical gear teeth of the worm gear 230 that is coupled to the drive platen 210, and the printed circuit board 960 is coupled along the bottom section 910d of the first case 910. Other components and features are shown in the second case 920, for example, the cable recess 920f and the document exit recess 920e. Portions of each of the assembled components in the first case 910 also reside within the second case 920 when the frameless USB scanning device 900 is fully assembled.

Figure 11:
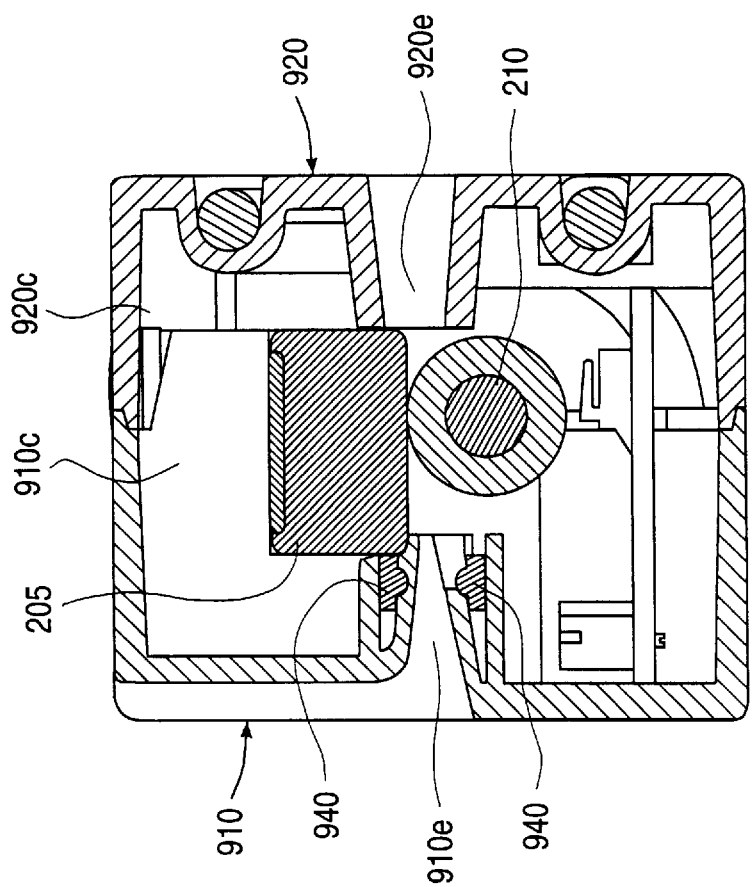
FIG. 11 is a cross-sectional side view of a frameless USB scanning device in accordance with an alternative embodiment of the present invention.

FIG. 11 is a cross-sectional side view of a frameless USB scanning device 900 in accordance with the present invention. The cross-sectional side view shows the CIS module 205 fixed to the upper section 910c of the first case 910 and coming in contact with the drive platen 210, which is movably coupled to the first case 910. Also shown is the document sensing LEDs 940 that sense placement of the document that is to be scanned.

Mounting the CIS module 205 to the upper section 910c of the front case 910 forms a rigid unit that does not twist or torque during operation of the frameless USB scanning device 900. In addition, mounting the CIS module 205 to the upper section 910c of the front case 910 also eliminates subsequent binding of the CIS module 205 when the drive platen 210 is rotated to feed a document through the frameless USB scanning device because the surfaces are not "gauged" into one another. Thus, additional drive motor torque is unnecessary so that the frameless USB scanning device reduces power consumption.

Further, because the CIS module 205 is fixed to the upper section 910c of the first case 910 and does not rotate, a smaller form factor is used for the frameless USB scanning device 900 because additional clearance is not required for the CIS module 205. Moreover, by assembling the components of the USB scanning device 900 directly into the cases 910, 920 without a separate frame, the frameless USB scanning device 900 costs significantly less to manufacture.

In addition, because the CIS module 205 remains fixed to the upper section 910c of the first case 910, the frameless USB scanning device 900 beneficially enhances scanning quality because the lenses of the CIS module 205 remain in contact with a document on the drive platen 210 as the document passes between the two. That is, because the CIS module 205 does not rotate, the lenses of the CIS module 205 do not shift off of the document, thereby causing an image loss resulting from that portion of the lens that is no longer in contact with the document.

The frameless USB scanning device 900 also operates on 1 watt, 5 volts, and 250 milliamps. It should be noted that these power requirements may be further reduced so that the USB scanning device 900 can operate with peripheral buses providing less parasitic power. To operate the frameless USB scanning device 900, the device 900 may be placed in an on state by pressing the scanner switch 930. A document is placed in the document recess 910e of the front case 910. The advantages of the center feed feature discussed above are applicable for the frameless USB scanning device 900. Once the document sensing LED 940 senses the presence of the document, a signal is sent to the printed circuit board 960, which triggers the worm drive motor 220 to begin operation. The single start worm 225 starts to rotate. As the single start worm 225 rotates, the worm drive gear 230 also rotates because the helical tooth of the single start worm 225 are meshed with the helical gear teeth of the worm gear 230. The advantages of the worm drive assembly discussed above in FIGS. 5 through 9 are applicable for the frameless USB scanning device 900.

Rotating the worm gear 230 rotates the drive platen 210. The friction surface of the drive platen 210 grasps the document and aligns the document under the CIS module 205 so that the lenses scan each line of the document. As each line is scanned, the drive platen 210 moves the document forward to exit the document from the document recess 920e of the back case 920. As the document passes through the frameless USB scanning device 900, the drive platen 210 moves in the longitudinal, or up and down, direction with respect to the front case 910 and the back case 920, while the CIS module 205 remains securely attached to the upper section 910c of the front case 910.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A document scanning device powered through a peripheral bus, comprising:
an engine housing having a first part and a second part, the first part having at least one side, each side having a longitudinal slot, the slot having a compression element, the first part and the second part coupled together on at least one side;
an image sensor, powered through the peripheral bus and having lenses for scanning an image of a document; and
a drive platen having a first end and a second end, each end having a bearing, the bearings resting on the compression element within each slot for movably coupling the drive platen with the two-part engine housing so that the drive platen moves in a substantially longitudinal direction with respect to the image sensor to permit a document to pass between the drive platen and the lenses of the image sensor, the image sensor fixed to the first part of the engine housing with the lenses facing the drive platen.

2. The document scanning device in claim 1, further comprising a worm drive assembly powered through the peripheral bus and coupled with the drive platen, to rotate the drive platen along a horizontal axis of the drive platen.

3. The document scanning device in claim 2, wherein the worm drive assembly further comprises a drive motor, a single start worm having a helical tooth, and a worm gear having gear teeth, the worm gear coupled to the first end of the drive platen, the single start worm coupled to the drive motor, the drive motor coupled to the two-part housing proximate to the worm gear for meshing the helical tooth of the single start worm with the gear teeth of the worm gear.

4. The document scanning device in claim 3, wherein the drive motor is a low power step motor.

5. A document scanning device powered through a peripheral bus, comprising:
a frame having an upper frame member, a lower frame member, a first side member and a second side member, each side member including a longitudinal slot and having a spring element resting within;
an image sensor having lenses for scanning a document image, the image sensor powered through the peripheral bus and fixed to the upper frame member of the frame so that the lenses face substantially in the direction of the lower frame member; and
a drive platen having a first end and a second end, each end having a bearing, the bearing of the first end resting on the spring element within the slot of the first side member and the bearing of the second end resting on the spring element within the slot of the second side member, for movably coupling the drive platen with the frame so that the drive platen moves in a substantially longitudinal direction with respect to the image sensor when a document passes between the drive platen and the lenses of the image sensor, the image sensor fixed to the upper frame member of the frame so that the lenses face substantially in the direction of the drive platen.

6. The document scanning device in claim 5, further comprising a worm drive assembly powered through the peripheral bus and coupled with the drive platen, to rotate the drive platen along a horizontal axis of the drive platen.

7. The document scanning device in claim 6, wherein the worm drive assembly further comprises a drive motor, a single start worm having a helical tooth, and a worm gear having gear teeth, the worm gear coupled to the first end of the drive platen, the single start worm coupled to the drive motor, the drive motor coupled to the first side member proximate to the worm gear for meshing the helical tooth of the single start worm with the gear teeth of the worm gear.

8. The document scanning device in claim 7, wherein the drive motor is a low power step motor.

9. The document scanning device in claim 5, wherein each bearing is comprises of a plastic bearing.

10. The document scanning device in claim 5, wherein the upper frame member comprises a channel, the channel housing the image sensor with the lenses of the image sensor exposed, for fixing the image sensor to the upper frame member.

11. A document scanning device powered through a peripheral bus, comprising:
a housing having a front case and a back case, the front case including an upper portion, a lower portion, a first side and a second side, each side having a channel and each channel having a tension spring element;

an image sensor having lenses for scanning a document image, the image sensor powered through the peripheral bus; and a drive platen having a first end and a second end, each end having a bearing, the bearing of the first end resting on the spring element within the channel of the first side of the front case and the bearing of the second end resting on the spring element within the channel of the second side of the front case, for movably coupling the drive platen with the housing so that the drive platen moves in a substantially longitudinal direction with respect to the image sensor when a document passes between the drive platen and the lenses of the image sensor, the image sensor fixed to the upper portion of the front case so that the lenses are positioned substantially towards the drive platen.

12. The document scanning device in claim 11, further comprising a worm drive assembly powered through the peripheral bus and coupled with the drive platen, to rotate the drive platen along a horizontal axis of the drive platen.

13. The document scanning device in claim 12, wherein the worm drive assembly further comprises a drive motor, a single start worm having a helical tooth, and a worm gear having gear teeth, the worm gear coupled to the first end of the drive platen, the single start worm coupled to the drive motor, the drive motor coupled to the two-part housing proximate to the worm gear, and meshing the helical tooth of the single start worm with the gear teeth of the worm gear.

14. The document scanning device in claim 13, wherein the drive motor is a low power step motor.

15. The document scanning device in claim 11, wherein the peripheral bus is a universal serial bus.

\* \* \* \* \*